Aug. 13, 1968  R. GARZON  3,397,350
CIRCUIT CONTROL RELAY UTILIZING CAPACITOR AND SCR MEANS
Filed Dec. 15, 1965
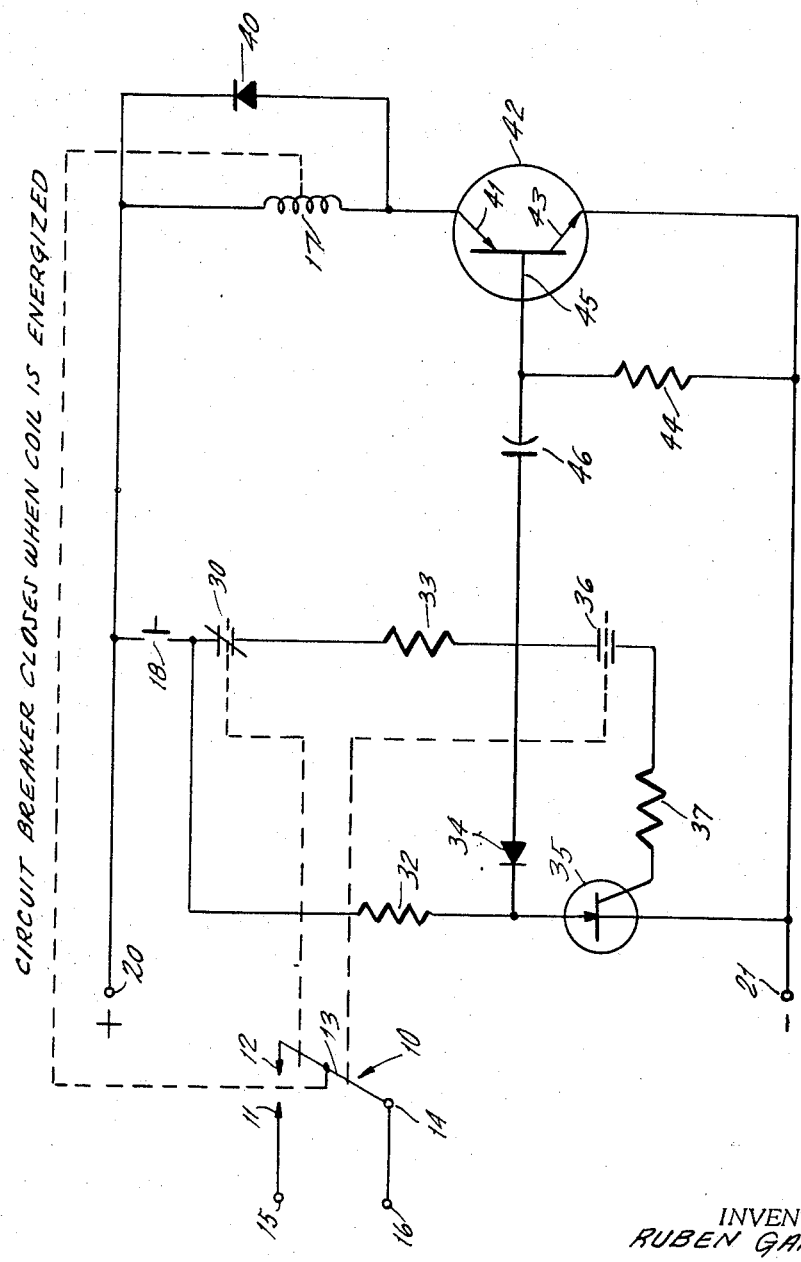
INVENTOR.
RUBEN GARZON
BY
OSTROLENK, FABER, GERB & SOFFEN
ATTORNEYS

United States Patent Office 3,397,350
Patented Aug. 13, 1968

3,397,350
CIRCUIT CONTROL RELAY UTILIZING CAPACITOR AND SCR MEANS
Ruben Garzon, Los Angeles, Calif., assignor to I-T-E Circuit Breaker Company, Philadelphia, Pa., a corporation of Pennsylvania
Filed Dec. 15, 1965, Ser. No. 513,970
1 Claim. (Cl. 317—142)

ABSTRACT OF THE DISCLOSURE

A control circuit for performing the function of X and Y relays for controlling the closing operation of a circuit breaker with a capacitor charging control arrangement for preventing pumping of the circuit breaker contacts.

---

This invention relates to a control relay structure for circuit breakers, and more specifically relates to a novel control relay arrangement for controlling the closing of a circuit breaker which uses non-moving parts and is not subject to contact bounce.

Electromechanical control relays for circuit breakers are well known to those skilled in the art, and are generally known as X and Y relays which are operative to control the closing operation of the circuit breaker. It has long been recognized that the X and Y relay contacts of the closing relays are subject to some degree of bounce which results in maintenance problems due to deterioration of the contacts. Moreover, failure or malfunction of the X and Y relay contacts can cause malfunctions in the closing duty of the circuit breaker. Clearly, where mechanical contacts are used, there is also a possibility of dirt accumulating between the contacts or misalignment of the moving parts which will also cause failures in the normal operation of the relays.

The principle of the present invention is to provide a novel electrical circuit including solid state switching elements arranged in a novel manner for achieving the normal energization of the circuit breaker closing coils, and for preventing "pumping" in the closing operation of the breaker. The problem of pumping is well known to the circuit breaker art, and refers to the condition in which, when the circuit breaker is closed on a fault, the trip means will cause an immediate opening. However, if the operator continues to hold the closing control contact closed, the breaker will immediately reclose, this sequence continuing until the closing contact is released by the operator. One function of X and Y relays is to prevent this condition.

Accordingly, a primary object of this invention is to provide a novel electrical circuit using no moving parts which serves the function of the standard X and Y relay of a circuit breaker.

Another object of this invention is to provide a novel closing relay arrangement for circuit breakers which is not subject to contact bounce and is unaffected by accumulation of dirt within a relay.

A still further object of this invention is to provide a novel closing relay for circuit breakers which is unaffected by mechanical vibration and shock.

Another object of this invention is to provide a novel replacement for the X and Y relay of a circuit breaker, which permits a great saving of space, and can cause circuit breaker closing without the time delay required by the normal pick-up time of a mechanical relay.

Another object of this invention is to substantially increase the reliability of the function performed by the standard X and Y relay of a circuit breaker.

These and other objects of this invention will become apparent from the following description of the accompanying drawing which shows a sketch of the novel circuit of the invention in combination with a schematically illustrated circuit breaker.

Referring to the drawing, I have schematically illustrated therein a circuit breaker 10 which is composed of a stationary contact 11 and a movable contact 12 carried on a movable contact arm 13 pivotally mounted at pivot 14. The stationary contact 11 is electrically connected to a first terminal 15, while the movable contact 12 and its movable contact arm 13 are electrically connected to terminal 16. Clearly, the contacts 11 and 12 are brought into engagement by rotation of the contact arm 13 in a counterclockwise direction.

The circuit breaker 10 is provided with any desired operating mechanism whereby the circuit breaker will be moved to its closed position responsive to the energization of closing coil 17. One of the functions of the standard X and Y relays of standard and well known circuit breakers is to control the energization of the closing coil 17 in such a manner that the coil 17 will be energized a single time to close the circuit breaker, and if the circuit breaker is closed on a fault and tripped by its normal fault-sensing tripping mechanism, the closing coil 17 will not be reenergized by the operator holding the closing contact engaged.

That is to say, the figure further illustrates a manually operable closing contact 18 which is depressed by the operator when it is wished to close the circuit breaker. If a simple electrical circuit were provided whereby the depression of contact 18 applied a suitable energizing current through the coil 17, it is possible for the circuit breaker to "pump" if it closes on a fault. This pumping operation, as pointed out above, is caused by the immediate tripping of the circuit breaker when it closes on the fault, but since the closing contact 18 is held closed by the operator, the circuit breaker will attempt to reclose again on the same fault.

All of this can happen within a fraction of a second, and the operator may not have sufficient time to release the closing contact with the repeated reclosing on the fault possibly resulting in severe damage to the circuit and the installation being protected, as well as possible injury to the operating personnel.

One of the functions of the X and Y relay structures is to prevent the possibility of pumping by intentionally removing power from the closing coil after a closing signal is once given.

The novel solid state relay of the drawing includes terminals 20 and 21 which are connected to the positive and negative sides of a suitable auxiliary voltage source, respectively. One side of manual contact 18 is then connected to a normally closed contact 30 which is controlled, as illustrated by the dotted lines, by the movement of the movable contact 12 in contact arm 13 of the circuit breaker 10. More particularly, contact 30 is held closed so long as contact arm 13 is in the open position and contact 30 moves to its open position when contact arm 13 begins to move toward its closed position.

The lower end of contact 18 is further connected to resistor 32, while the lower end of contact 30 is connected to resistor 33. Resistors 32 and 33 are then connected across the anode and cathode terminals, respectively, of diode 34, while the anode of diode 34 is connected to the cathode of thyristor 35.

The cathode of diode 34 is then connected to one end of contact 36 which is normally open when the circuit breaker contact arm is open, and is moved to the closed position when the circuit breaker contact arm 13 begins to move to its closed position. Note that the figure schematically illustrates a connection from contact arm 13 to contact 36 by dotted line connections. The lower end of contact 36 is then connected through a resistor 37 to the gate electrode of thyristor 35, and the anode of thyristor 35 is then connected to negative terminal 21.

Closing coil 17 which, as previously indicated, will initiate the movement of contact arm 13 to its closed position when the closing coil is energized, is connected in shunt with a diode 40 and is further connected to the anode terminal 41 of a gate turn-off controlled rectifier 42. The cathode terminal 43 of the gate turn-off controlled rectifier is connected to negative terminal 21. A gate to cathode resistor 44 is connected from gate 45 to negative terminal 21. A capacitor 46 is then connected between the anode of diode 34 and the upper end of resistor 44, as shown.

The operation of the device is as follows:

When the circuit breaker 10 is in its open position and it is desired to close the circuit breaker, the contact 18 is manually closed by the operator. Capacitor 46 will then charge to the voltage across terminals 20 and 21 through resistor 33 and the effective gate impedance of the gate turn-off controlled rectifier 42.

Thus, an exponentially decaying current will flow into the gate for control electrode 45 of the gate turn-off controlled rectifier 42 which will trigger the device into conduction from electrodes 41 to 43. This will permit the energization of control coil 17 from the D-C auxiliary source connected to terminals 20 and 21 thereby to cause the circuit breaker to begin to move toward its closed position. As the circuit breaker begins to move toward its closed position, contact 30 will open, thereby holding capacitor 46 charged to the voltage of the supply source.

The contact 36 will then close when the arm 31 of the circuit breaker reaches some predetermined position in its closing stroke, thereby permitting capacitor 46 to discharge through the gate circuit of thyristor 35. This willl cause controlled rectifier 35 to become conductive, thereby short-circuiting capacitor 46 and applying a reverse bias on the gate 45 of the gate turn-off device 42, thus placing it into its non-conducting state. Note that the controlled rectifier 35 will perform an anti-pump function by short circuiting capacitor 46, whereupon it is not possible to reenergize closing coil 17 a second time without first releasing manual closing contact 18.

It will become apparent that when the gate turn-off switch 42 becomes non-conductive, the closing coil 17 is deenergized and will remain deenergized since it is no longer possible to charge capacitor 46 until controlled rectifier 35 ceases its conduction.

Controlled rectifier 35 is deenergized only when contact 18 is permitted to open by the operator, whereupon the complete circuit is ready for a subsequent operation when necessary, and is automatically reset.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claim.

The embodiments of the invention in which an exclusive privilege or property is claimed are defined as follows:

1. A closing control circuit for a circuit breaker; said circuit breaker comprising a pair of cooperable contacts movable between an open and closed position, and a closing coil connected to said circuit breaker for moving said pair of cooperable contacts toward their said closed position responsive to energization of said closing coil; a first switch, and a second switch each connected to one of said pair of cooperable contacts; said first switch in a closed position when said pair of cooperable contacts are closed and being moved to an open position when said pair of cooperable contacts are moved toward their said open position; said second switch in an open position when said pair of cooperable contacts are closed and being moved to a closed position when said pair of cooperable contacts are moved toward their said open position; a manually operable closing switch, a source of D-C power, a controlled rectifier, a capacitor and a gate turn-off controlled rectifier; said gate turn-off controlled rectifier having a control electrode and a first and second main electrode; said source of D-C power, said manually operable closing switch, said second switch, said capacitor and said control electrode connected in series; whereby closing of said manual closing switch charges said capacitor and applies a firing signal to said control electrode of said gate turn-off controlled rectifier; said source of D-C power, said closing coil, and said first and second main electrodes connected in series whereby firing of said gate turn-off controlled rectifier permits energization of said closing coil to cause said pair of cooperable contacts to move to their said closed position; said controlled rectifier having a gate electrode, an anode and a cathode; said manual closing switch, anode electrode, cathode and D-C source connected in series; said capacitor, said first switch and said gate electrode connected in series; said capacitor connected to said anode electrode whereby charging of said capacitor to fire said gate turn-off controlled rectifier and to energize said closing coil fires said controlled rectifier to discharge said capacitor until said manually operable control switch is opened.

References Cited

UNITED STATES PATENTS

| | | | |
|---|---|---|---|
| 3,303,396 | 2/1967 | Culbertson | 317—142 |
| 3,205,411 | 9/1965 | Culbertson | 317—142 |
| 3,114,083 | 12/1963 | Winchel | 317—148.5 |
| 3,099,758 | 7/1963 | Pieczynski | 307—131.8 |

LEE T. HIX, *Primary Examiner.*

J. SILVERMAN, *Assistant Examiner.*